Aug. 25, 1925.  
J. PHILLIPS  
TRACTOR TRUCK  
Filed May 3, 1920  
1,550,982  
4 Sheets-Sheet 1
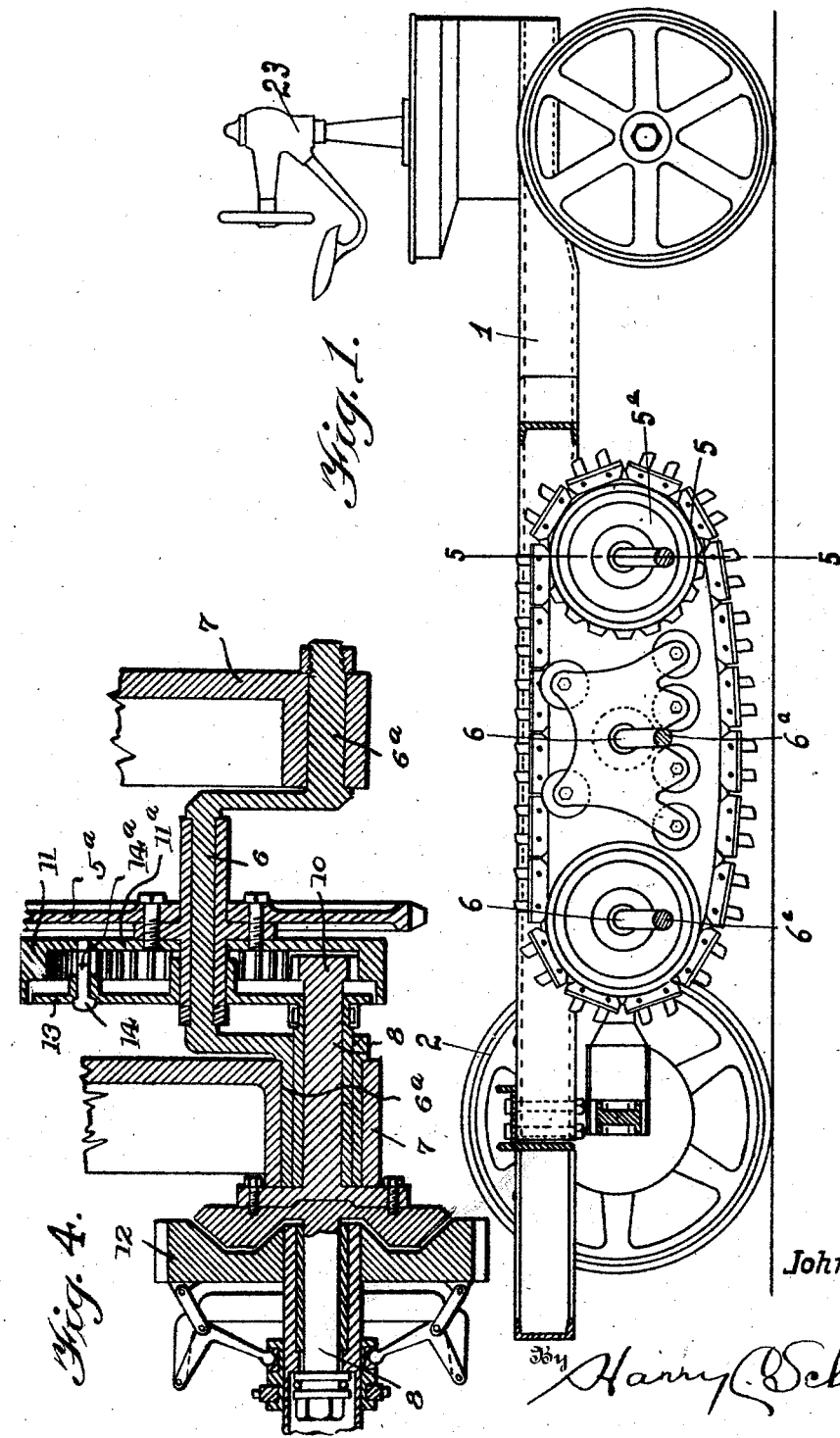
Inventor  
John Phillips.  
By Harry C. Schwede  
Attorney

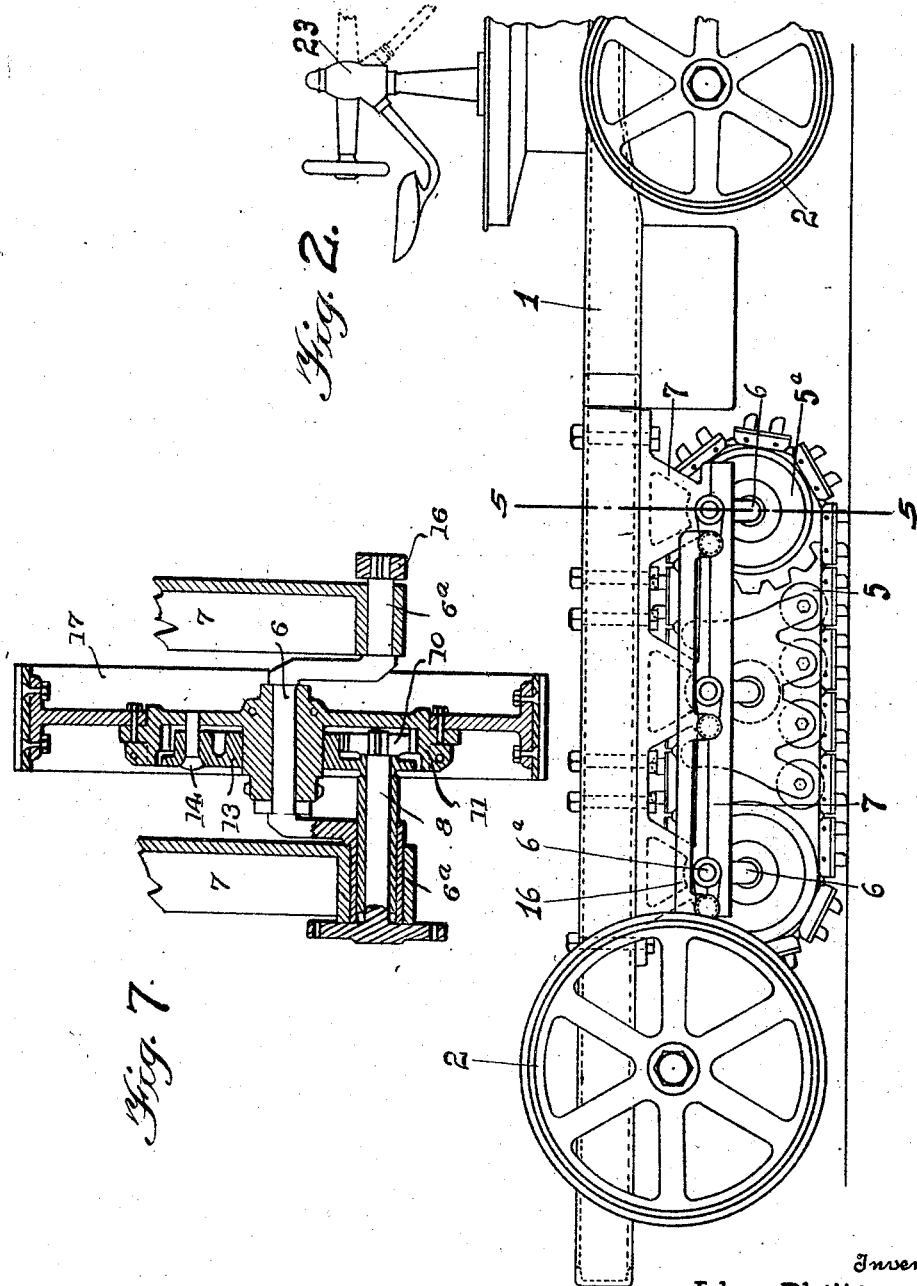

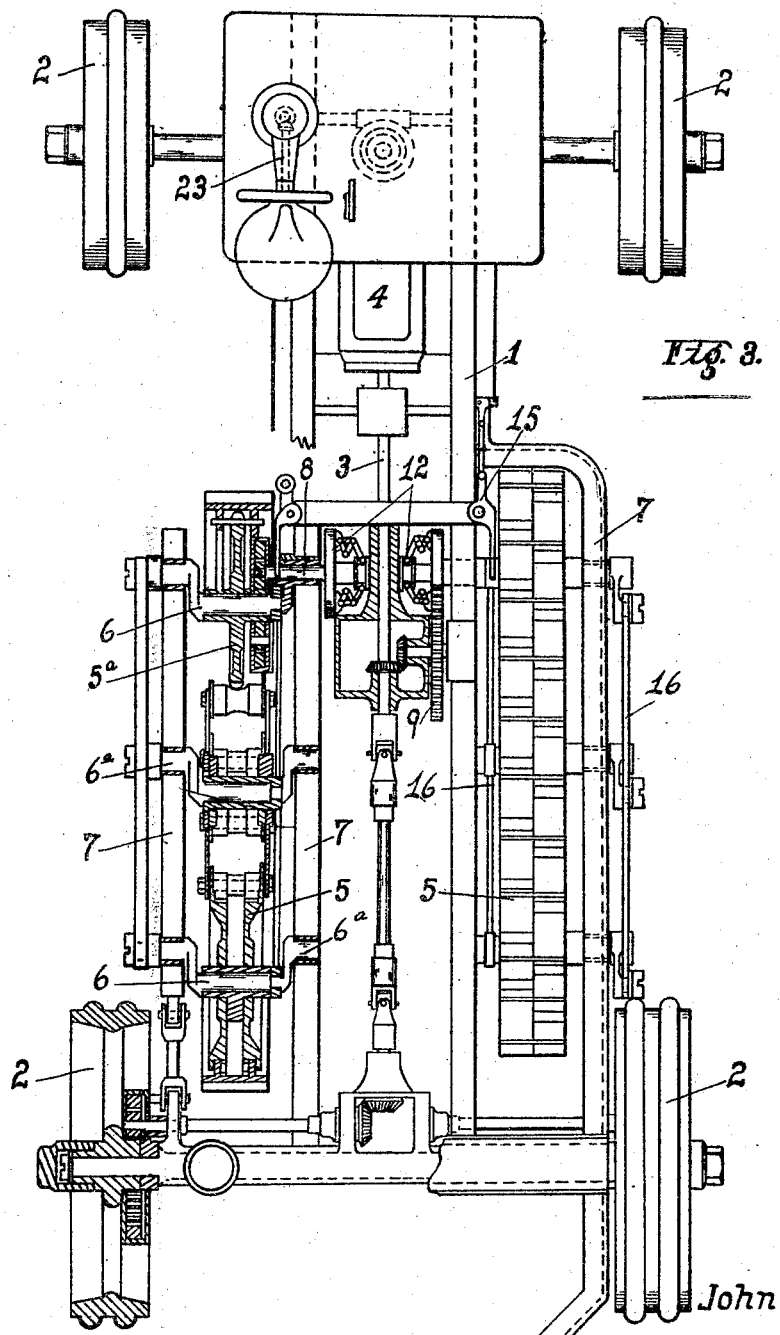

Aug. 25, 1925.  1,550,982
J. PHILLIPS
TRACTOR TRUCK
Filed May 3, 1920 4 Sheets-Sheet 4
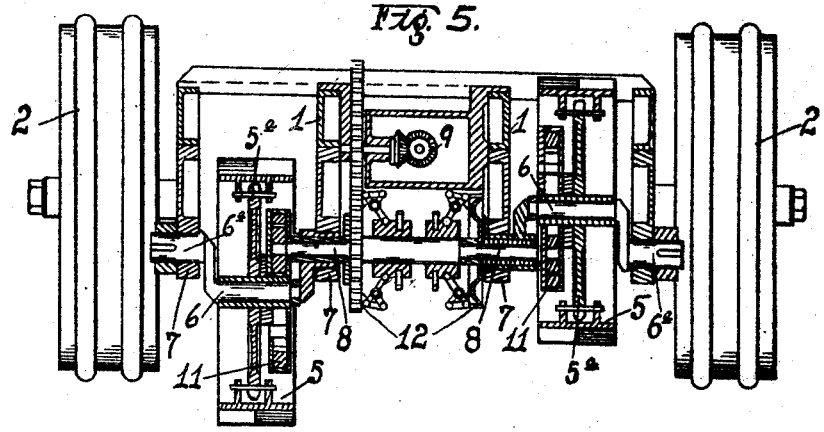
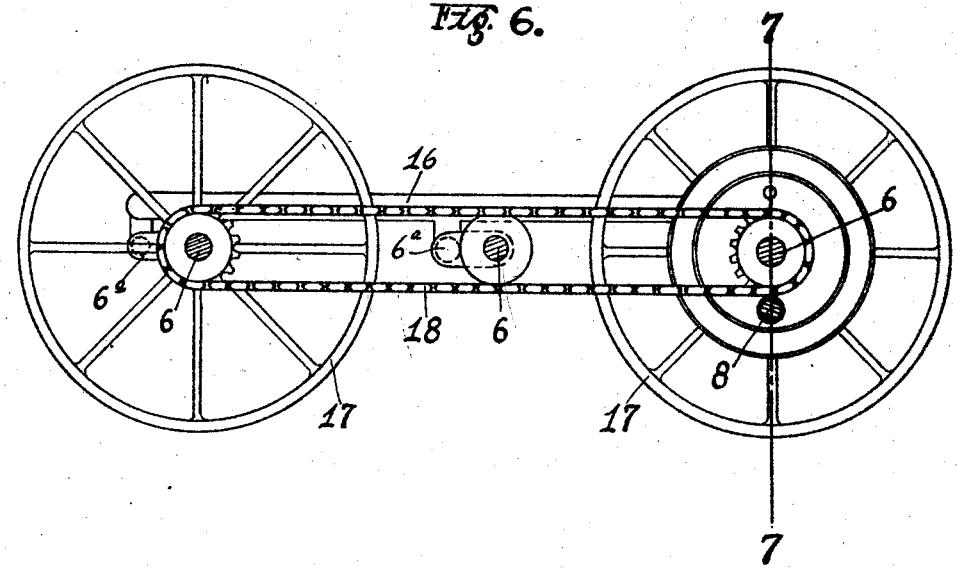
Inventor
John Phillips.
By Harry C. Schroeder
Attorney Patented Aug. 25, 1925.

1,550,982

UNITED STATES PATENT OFFICE.

JOHN PHILLIPS, OF PITTSBURGH, PENNSYLVANIA.

TRACTOR TRUCK.

Application filed May 3, 1920. Serial No. 378,688.

*To all whom it may concern:*

Be it known that I, JOHN PHILLIPS, a citizen of the United States, residing at Pittsburgh, in the county of Allegheny and State of Pennsylvania, have invented certain new and useful Improvements in Tractor Trucks, of which the following is a specification.

This invention relates to a combined tractor and truck.

The principal object of the invention is to provide a four wheel truck with an endless-track structure adapted to be driven by the engine of the truck, normally raised clear of the ground, but arranged to be lowered to cooperate with the ground and drive the truck when the wheels of the latter encounter soft or sandy ground where they are apt to lose traction.

This device will be especially useful in trucks operating where there are no good roads, such as on ranches, over deserts, in mountainous regions, and around logging camps.

The particular construction I employ is fully set forth and described hereinafter, reference in such description being had to the accompanying drawings, in which:

Figure 1 is a side view partly in section of my improved tractor and truck, the track mechanism being raised from the ground.

Figure 2 is a side view showing the tractor carrying the full load of the truck.

Figure 3 is a top plan view, partly in section.

Figure 4 is a horizontal fragmentary sectional view of one of the tractor control clutches and gears.

Figure 5 is a vertical cross sectional view taken on the line 5—5 of Figure 2.

Figure 6 is a side view of one of the tractor units employing wheels in place of a track.

Figure 7 is a section taken on the line 7—7 of Figure 6.

On the drawings, similar characters of reference indicate corresponding parts in the several views.

Referring now more particularly to said numerals of reference, the numeral 1 denotes the chassis of the truck, having supporting wheels 2, the rear ones of which are driven from the drive shaft 3 of the power plant 4 in any suitable manner.

On each side of the chassis 1 are endless-track structures 5. These units are mounted on the cranks 6 of a plurality of crank shafts 6$^a$, which themselves are journaled in subframes 7 fixed to the chassis 1. A common transverse drive shaft 8 extends through one set of the crank shafts 6$^a$, and is driven from the drive shaft 3 by suitable gearing 9. Pinions 10 on the ends of the shaft 8 mesh with internal gears 11 fixed to one of the sprocket wheels or rollers 5$^a$ of the endless track structure. A clutch 12 is interposed on the shaft 8 to control the power thereto from the drive shaft.

Slidably mounted on the shaft 8 and the corresponding cranks 6 are discs 13, one for each tractor unit, each having a pin 14 projecting therefrom and adapted to engage a hole 14$^a$ provided in the web 11$^a$ of the gear 11. These discs are slid by any suitable link and lever connections 15 operated from the driver's seat. Connecting bars 16 through cranks 16$^b$ forming an integral part of the crank 6 connect all the crank shafts 6$^a$ on a side, so that they will move in unison. If desired, the endless track structure may be replaced by a wheeled structure 17 (Fig. 7), the wheels of which are connected in driving relation by a chain 18 or similar means.

The wheels 17 may be raised and lowered by the disk and pin arrangement 13 and 14 in cooperation with the internal gear 11.

When the endless track structure is in its raised position, as shown in Fig. 1, the pin 14 projects into the hole 14$^a$ in the internal gear 11, the crank arms of the crank 6 extending slightly rearwardly of the perpendicular. Further rearward movement is prevented by the crank 16$^b$ having already reached the limit of its movement. The track structure is, therefore, held in its raised position by means of the pins 14, crank arm 16$^b$, connecting bars 16 and gravity. When it is desired to lower the track structure, the pins 14 are withdrawn from the holes 14$^a$ in the internal gear 11, so that the internal gear 11 can planetate as it is driven by the pinion 10, the axis of its planetation being the axis of the pinion 10. This is caused by the pinion 10 turning clockwise and tending to climb on the teeth of the internal gear 11. This movement is imparted in a counter-clockwise direction to the crank 6.

The initial movement of the pinions will cause the cranks to turn, bringing the tractor structure to the ground. Due to the climbing action of the pinions on the gears, the power transmitted thereto will cause the truck to be lifted, until the limit of upward movement of the truck relative to the tractor structure is had, as shown in Figure 2. The harder the pull, or the greater the resistance of the track structure to turning, the greater will be the lift of the truck from the ground, within the limits specified.

When it is desired to raise the track structure, the holding pins 14 are again moved into engagement with their respective holes, and the shaft 8 is reversed by virtue of the rotation of the shaft 3, as is well-known in the art, and the reverse action from that described in regard to lowering the structure takes place. When the crank has been raised to the point where it would be held in its raised position, as above-described, the clutch 12 is disengaged so that the pinion 10 ceases to rotate and the disks 13 and the gears 11 are held in locked engagement.

Ordinarily the weight of the tractor will keep it on the ground and the tractor will drive the vehicle with its wheels on the ground. On a severe pull the tractor will raise the whole vehicle off its wheels and all the weight will be sustained by the tractor, and the tractor will drive the vehicle. The connecting bar 16 engages the bearings in which the crank shafts 6a are journaled to prevent counter-clockwise movement of the cranks 6 when the tractor is on the ground and to prevent clockwise movement of the cranks when the tractor is elevated.

The front axle 19 of the truck is supported by a central post 20, turnable in a boring 21 carried by the frame 1. A transverse plate 22 bears against the axle, being turned to the right or left, and hence turning the axle likewise, through the medium of a steering mechanism 23.

Having described my invention, what I claim as new and useful and desire to secure by Letters Patent is:—

1. A combined tractor and truck comprising a wheel-mounted chassis, an auxiliary driven ground bearing structure carried by the chassis and normally raised from the ground, crank arms journaled in the frame, the cranks thereof being journaled in the auxiliary structure, and means for driving said auxiliary structure, and means connecting said driving means and said crank arms whereby said crank arms are rotated.

2. A combined tractor and truck comprising a wheel-mounted chassis, an auxiliary driven ground bearing structure carried by the chassis and normally raised from the ground, crank arms journaled in the frame, the cranks thereof being journaled in the auxiliary structure, a driving gear for such structure journaled on one of such cranks, a driven shaft passing through the crank shaft, and a pinion on the driven shaft meshing with said gear.

3. A combined tractor and truck including a wheel-mounted chassis, a pair of cranks journaled on said chassis, a tractor including sprockets and said cranks on which the tractor sprockets are journaled, an internal gear secured concentrically to one of the tractor sprockets, a disk turnably mounted upon one of said cranks, a tractor drive shaft journaled in one of the crank journals and extending through said disk, a pinion on the end of said drive shaft meshing with said internal gear, a pin in said disk for engaging an aperture in said internal gear to prevent rotation of said crank and hold the tractor elevated on the chassis, and means whereby said tractor drive shaft is driven by the truck engine.

4. A combined tractor and truck including a wheel-mounted chassis, a pair of cranks journaled on said chassis, a tractor including sprockets and said cranks on which the tractor sprockets are journaled, an internal gear secured concentrically to one of said tractor sprockets, a tractor drive shaft journaled in one of the crank journals, a pinion on said drive shaft meshing with said internal gear, means whereby the drive shaft may be driven by the truck engine, crank arms secured to the journals of said cranks, and a bar connected to said crank arms for engaging the bearings of the crank journals to limit the downward swinging movement and the upward swinging movement of said tractor.

In testimony whereof I affix my signature.

JOHN PHILLIPS.